(12) United States Patent  
Gunturu et al.

(10) Patent No.: US 12,119,908 B2  
(45) Date of Patent: Oct. 15, 2024

(54) METHODS AND SYSTEMS FOR ADAPTING BEAMWIDTH OF BEAMS ON NR PHYSICAL CHANNELS

(71) Applicant: Samsung Electronics Co., Ltd., Suwon-si (KR)

(72) Inventors: Anusha Gunturu, Bangalore (IN); Ashok Kumar Reddy Chavva, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 555 days.

(21) Appl. No.: 17/417,637

(22) PCT Filed: Feb. 12, 2020

(86) PCT No.: PCT/KR2020/001991  
§ 371 (c)(1),  
(2) Date: Jun. 23, 2021

(87) PCT Pub. No.: WO2020/166981  
PCT Pub. Date: Aug. 20, 2020

(65) Prior Publication Data  
US 2022/0116100 A1   Apr. 14, 2022

(30) Foreign Application Priority Data

Feb. 12, 2019  (IN) .............................. 201941005527  
Apr. 29, 2019  (IN) .............................. 201941016997  
Feb. 11, 2020  (IN) .............................. 2019 41005527

(51) Int. Cl.  
*H04B 7/06*      (2006.01)  
*H04B 7/0456*    (2017.01)  
(Continued)

(52) U.S. Cl.  
CPC ......... *H04B 7/0617* (2013.01); *H04B 7/0456* (2013.01); *H04B 7/0695* (2013.01);  
(Continued)

(58) Field of Classification Search  
CPC .................................................... H04B 7/0617  
See application file for complete search history.

(56) References Cited

U.S. PATENT DOCUMENTS

2016/0066279 A1   3/2016  Lee et al.  
2016/0308279 A1*  10/2016  Athley .................. H01Q 1/246  
(Continued)

FOREIGN PATENT DOCUMENTS

CN   107534478 A    1/2018  
EP   3 509 228 A1   7/2019  
(Continued)

OTHER PUBLICATIONS

TR 38.321, 3GPP, Medium Access Control (MAC) protocol specification, Mar. 2021, Valbonne—France.  
(Continued)

*Primary Examiner* — Jason E Mattis  
(74) *Attorney, Agent, or Firm* — Jefferson IP Law, LLP

(57) ABSTRACT

A pre-5th-Generation (5G) or 5G communication system to be provided for supporting higher data rates Beyond 4th-Generation (4G) communication system such as Long Term Evolution (LTE). Methods and systems for adapting beamwidth of beams on NR physical channels are provided. Alignment between beams of a UE and a gNB is created by refining beam codebooks. Phase shifters and PAs/LNAs of antenna elements are tuned for refining the beam codebooks. Strength of a signal, received through different RX beams, is determined based on RSRP/SINR associated with the different RX beams. A direction is determined, along which RSRPs/SINRs associated with consecutive RX beams is  
(Continued)

increasing. A pair of RX beams is determined, the RSRP/SINR associated with a first beam being greater than e RSRP/SINR associated with a second beam, and the RSRP/SINR associated with the first beam is the greatest along the determined direction.

10 Claims, 14 Drawing Sheets

(51) Int. Cl.
H04B 7/08 (2006.01)
H04B 17/318 (2015.01)
H04B 17/336 (2015.01)
H04W 16/28 (2009.01)

(52) U.S. Cl.
CPC ......... *H04B 7/0857* (2013.01); *H04B 7/088* (2013.01); *H04B 17/318* (2015.01); *H04B 17/336* (2015.01); *H04W 16/28* (2013.01)

(56) References Cited

U.S. PATENT DOCUMENTS

| | | |
|---|---|---|
| 2018/0048375 A1 | 2/2018 | Guo et al. |
| 2018/0152231 A1 | 5/2018 | Jeong et al. |
| 2018/0159607 A1 | 6/2018 | Rybakowski et al. |
| 2018/0269953 A1 | 9/2018 | Kang et al. |
| 2019/0044600 A1* | 2/2019 | Milleth ................ H04B 7/0695 |
| 2019/0173533 A1 | 6/2019 | Kim et al. |
| 2019/0319686 A1 | 10/2019 | Chen, IV et al. |
| 2019/0334607 A1 | 10/2019 | Kim |
| 2020/0007216 A1* | 1/2020 | Nasiri Khormuji ........................ H04W 72/046 |
| 2020/0067590 A1* | 2/2020 | Wang ................... H04B 17/318 |
| 2020/0275523 A1* | 8/2020 | Zhang ................. H04B 7/0695 |

FOREIGN PATENT DOCUMENTS

| | | |
|---|---|---|
| KR | 10-2018-0016301 A | 2/2018 |
| WO | 2017/061679 A1 | 4/2017 |
| WO | 2018/017840 A1 | 1/2018 |
| WO | 2018/030811 A1 | 2/2018 |
| WO | 2018/117693 A1 | 6/2018 |
| WO | 2018/183991 A1 | 10/2018 |

OTHER PUBLICATIONS

TR 38.214, 3GPP, NR, Physical layer procedures for data, Mar. 2021, Valbonne—France.
European Office Action dated Jul. 6, 2023, issued in European Application No. 20756533.4.
Extended European Search Report dated Jan. 31, 2022, issued in European Patent Application No. 20756533.4.
Chinese Office Action with English translation dated Feb. 4, 2024; Chinese Application No. 202080014089.0.

\* cited by examiner

METHODS AND SYSTEMS FOR ADAPTING BEAMWIDTH OF BEAMS ON NR PHYSICAL CHANNELS

CROSS-REFERENCE TO RELATED APPLICATION(S)

This application is a U.S. National Stage application under 35 U.S.C. § 371 of an International application number PCT/KR2020/001991, filed on Feb. 12, 2020, which is based on and claims priority of an Indian patent application number 201941005527, filed on Feb. 12, 2019, in the Indian Patent Office, of an Indian patent application number 201941016997, filed on Apr. 29, 2019 in the Indian Patent Office, and of an Indian patent application number 201941005527, filed on Feb. 11, 2020, in the Indian Patent Office, the disclosure of each of which is incorporated by reference herein in its entirety.

BACKGROUND

1. Field

The disclosure relates to Fifth Generation (5G) New Radio (NR) communication systems. More particularly, the disclosure relates to methods and systems for generating beams, with appropriate beam properties, on NR physical channels.

2. Description of Related Art

To meet the demand for wireless data traffic that has increased since deployment of fourth generation (4G) communication systems, efforts have been made to develop an improved 5G or pre-5G communication system. Therefore, the 5G or pre-5G communication system is also called a 'Beyond 4G Network' or a 'Post long term evolution (LTE) System'.

The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In beam management procedure P3, a User Equipment (UE) sweeps over all Receiver (RX) beams with respect to each of the Next Generation Node B (gNB) Transmitter (TX) beams. There are possibilities, wherein UE RX beams are not aligned with a gNB TX beam, during the P3 procedure. A complete alignment between the gNB TX beam and the UE RX beams may not be necessary for initial acquisition. However, there is a requirement for alignment between the gNB TX beams and UE RX beams for successfully receiving Random Access Channel (RACH) signals and unicast data. The requirement for beam alignment is especially necessary, if the UE is not stationary. Considering that the same set of beams can be used by the UE for uplink transmissions, non-alignment of the beams due to movement of the UE can affect uplink transmissions. Non-alignment between the TX and RX beams can deteriorate the performance of the UE in different scenarios and can cause link failures in Millimeter (mm) wave systems.

FIG. 1 depicts an example scenario, wherein UE RX beams and a gNB TX beam are not aligned with one another according to the related art. There can be three UE RX beams, viz., beam 'i', beam 'i+1', and beam 'i+2'.

Referring to FIG. 1, the RX beam sweep operation at the UE is likely to miss the direction of the TX beam, causing non-alignment between the UE RX beams and the gNB TX beam.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for creating an alignment between the beams of a User Equipment (UE) and the beams of a Next Generation Node B (gNB) by refining beam codebooks of the beams of the UE, wherein the refined beam codebooks can be used to generate beams having appropriate beam properties and there is alignment between the generated beams of the UE and the beams of the gNB.

Another aspect of the disclosure is to refine the beam codebooks by tuning phase angles of phase shifters and gains of Power Amplifiers or Low Noise Amplifiers (PAs/LNAs) of antenna elements of the UE for the generation of beams with a wider or narrower beamwidths.

Another aspect of the disclosure is to refine the beam codebooks, to generate a wider beam or narrower beam, based on a distance between the UE and the gNB, conditions of channels between the UE and the gNB, and type of messages transmitted/received between the UE and the gNB.

Another aspect of the disclosure is to optimize Reference Signal Received Power/Signal to Interference and Noise Ratio (RSRP/SINR) measurements of a Transmission (TX) beam received using different Reception (RX) beams.

Additional aspects will be set forth in part in the description which follows and, in part, will be apparent from the description, or may be learned by practice of the presented embodiments.

In accordance with an aspect of the disclosure, methods and systems for creating alignment between beams of a User Equipment (UE) and a Next Generation Node B (gNB) are provided. The methods and systems include creating the alignment between the beams of the UE and the gNB by refining beam codebooks of the beams of the UE. The embodiments include determining strength of a transmitted signal, received through different Receiver (RX) beams, based on either of Reference Signal Received Power (RSRP)

or Signal to Interference and Noise Ratio (SINR) associated with different RX beams. The embodiments include determining a direction along which the RSRPs/SINRs associated with consecutive RX beams is increasing. The embodiments include determining a pair of RX beams, wherein the RSRP/SINR associated with the first RX beam is greater than the RSRP/SINR associated with the second RX beam, wherein the RSRP/SINR associated with the first RX beam is the greatest along the direction in which the RSRPs/SINRs associated with the consecutive RX beams is increasing. The embodiments include tuning the angles of phase shifters and the gains of Power Amplifiers and Low Noise Amplifiers (PAs/LNAs) of one or more UE antenna elements to refine the beam codebooks. The embodiments include generating a beam having appropriate beam properties, i.e., a beam having a wider beamwidth or a beam having a narrower (directional) beamwidth based on the tuning, to align a RX beam in the direction of a Transmitter (TX) beam. The embodiments include generating either the wider beam or the narrower beam, based on a distance between the UE and the gNB, conditions of channels used for communication between the UE and the gNB, and type of messages exchanged between the UE and the gNB. The embodiments include optimizing measurement of a gNB TX beam using UE RX beams.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
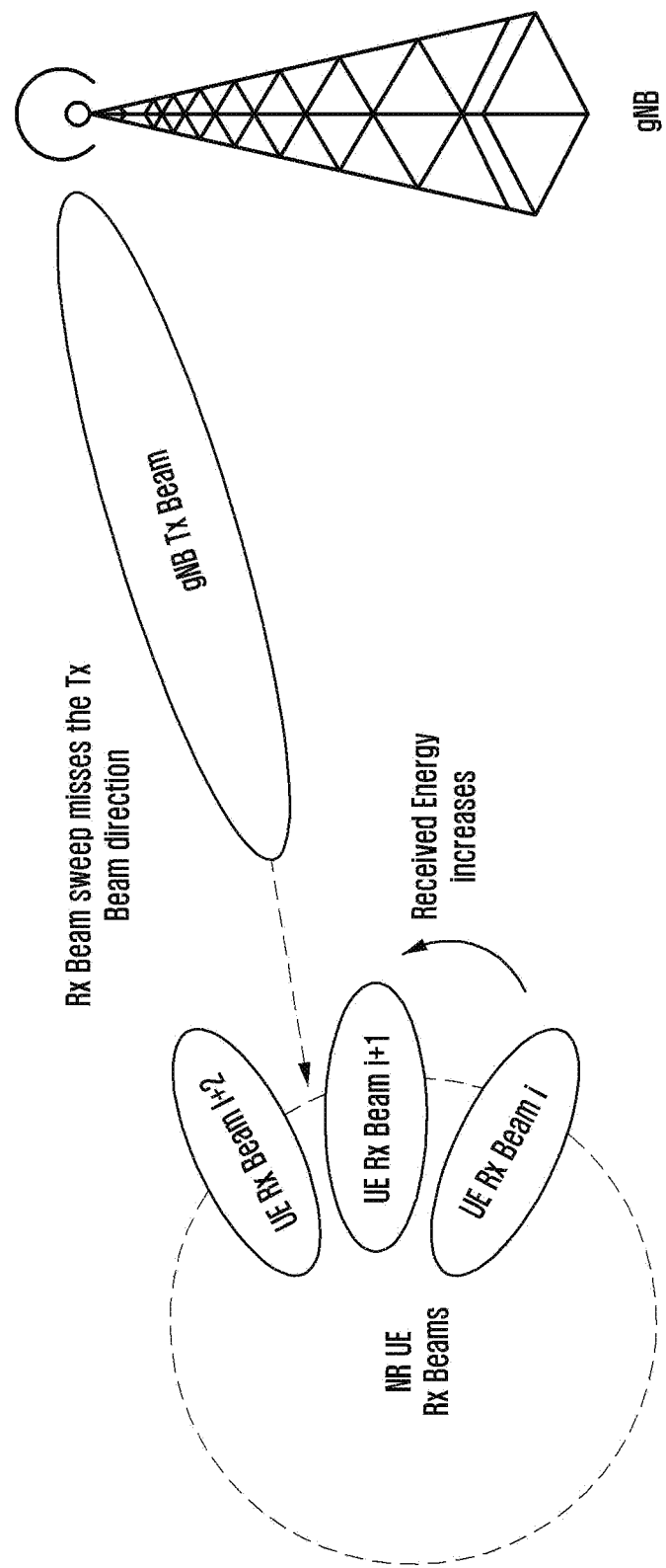
FIG. 1 depicts an example scenario, wherein User Equipment (UE) Receiver (RX) beams and a Next Generation Node B (gNB) Transmitter (TX) beam are not aligned with one another according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose methods and systems for adapting the beamwidth of beams in a Fifth Generation (5G) New Radio (NR) communication system for creating alignment between beams of a User Equipment (UE) and a Next Generation Node B (gNB). The embodiments include creating an alignment between the beams of the gNB and the UE by refining codebooks of the beams of the UE. The embodiments include refining the beam codebooks of the beams of the UE by tuning phase shifters and Low Noise Amplifiers/Power Amplifiers (LNAs/PAs) of the antenna elements of the UE. The embodiments include generating a beam with a wider beamwidth or a beam with a narrower beamwidth, based on the refinement of the beam codebooks of the beams the UE. The wide beam or the narrow beam is aligned with a gNB beam for improving transmission and reception between the UE and the gNB.

Referring now to the drawings, and more particularly to FIGS. 2 to 5, 6A to 6C, and 7 to 12, where similar reference characters denote corresponding features consistently throughout the figures, there are shown preferred embodiments.

Figure 2:
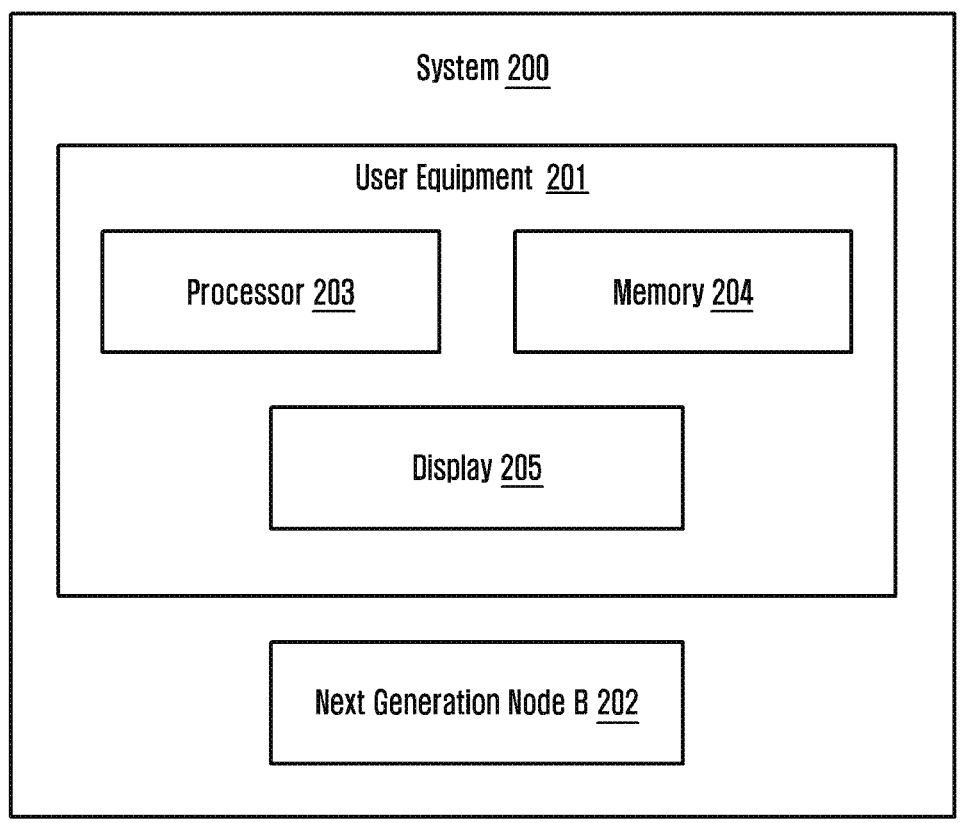
FIG. 2 depicts various units of a system configured to adapt beamwidths of beams of a UE on a New Radio (NR) physical channel, according to an embodiment of the disclosure.

FIG. 2 depicts various units of a system configured to adapt beamwidths of beams of a UE on a NR physical channel, according to an embodiment of the disclosure.

Referring to FIG. 2, a system 200 comprises at least one UE 201 and at least one gNB 202. A UE 201 is capable of communicating with a gNB 202 either as a transmitter or a receiver. If the UE 201 is acting as a receiver, the gNB 202 acts as a transmitter. Similarly, if the UE 201 is acting as a transmitter, the gNB 202 acts as a receiver. The UE 201 further comprises a processor 203, a memory 204, and a display 205. The processor 203 can comprise of at least one of an application processor and a communication processor (not shown).

The processor 203 can determine whether there is alignment between the beams of the UE 201 and the beams of the gNB 202. If the strength of a signal received through the RX beams is less than a predefined decoding threshold, the UE 201 can deduce that there is no alignment between the beams of the UE 201 and the beams of the gNB 202. The UE 201 can create the alignment by refining beam codebooks of the beams of the UE 201. In an embodiment, consider that the UE 201 is acting as a receiver and the gNB 202 is acting as a transmitter. Consider that the UE 201 is attempting to receive a signal, in a Transmitter (TX) beam, from the gNB 202. The processor 203 can determine the strength of the signal received through Receiver (RX) beams of the UE 201.

In an embodiment, the strength of the signal received through a RX beam can be determined based on Reference Signal Received Power (RSRP) associated with the RX beam. In an embodiment, the strength of the signal received through the RX beam can be determined based on a Signal to Interference and Noise Ratio (SINR) associated with the RX beam.

Once the strength of the signal received through the different RX beams is determined based on the RSRPs/SINRs associated with the different RX beams of the UE 201, the processor 203 can determine a direction along which the RSRPs/SINRs associated with consecutive RX beams is increasing. In an example, consider that, based on active antenna elements in the UE 201, four RX beams can receive a signal that is transmitted by the gNB 202 through a TX beam. The RX beams can be referred to as beam 'A', beam 'B', beam 'C', and beam 'D'. The UE 201 beams A-D are the RX beams, through which the UE 201 can receive the signal in the TX beam, transmitted by the gNB 202.

The processor 203 can determine a pair of RX beams, wherein the RSRP/SINR associated with a first RX beam is greater than the RSRP/SINR associated with a second RX beam and the RSRP/SINR associated with the first RX beam is the greatest along the direction in which the RSRPs/SINRs associated with the consecutive RX beams is increasing. Consider the abovementioned example, wherein the beam D is consecutive to beam A, beam A is consecutive to beam B, beam B is consecutive to beam C, and beam C is consecutive to beam D. The order in which the UE 201 can perform RX beam sweep (sweeping across consecutive beams) can be, C-B-A-D, A-B-C-D, B-A-D-C, and so on.

The processor 203 can determine that the RSRP/SINR associated with the beam C is less than the RSRP/SINR associated with the beam B. Similarly, the RSRP/SINR associated with the beam B is less than the RSRP/SINR associated with the beam A. The RSRP/SINR associated with the beam A can be greater than the RSRP/SINR associated with the beam D. Based on the determined RSRP/SINR values of the RX beams, the processor 203 can determine that C-B-A is the direction along which the values of the RSRPs/SINRs associated with the consecutive RX beams is increasing. The processor 203 can consider the beam A as the first RX beam, as RSRP/SINR associated with beam A is the greatest along which the values of RSRPs/SINRs associated with the consecutive RX beams is increasing. The processor 203 can consider the beam D as the second RX beam, as RSRP/SINR associated with the beam A is greater the than the RSRP/SINR associated with the beam D.

The processor 203 can tune the angles of phase shifters and the gains of Power Amplifiers and Low Noise Amplifiers (PAs/LNAs) of one or more antenna elements of the UE 201. The tuning can lead to the refinement of the beam codebooks of the RX beams. In an embodiment, the processor 203 can perform the tuning to generate a third RX beam, having a beamwidth that is wider than the first RX beam and the second RX beam. The generation of the third RX beam can lead to the replacement of the first RX beam and the second RX beam. The replacement of the first RX beam and the second RX beam can lead to the reduction of the number of active antenna elements, which can reduce the power consumption of the UE 201.

In another embodiment, the processor 203 can perform the tuning to generate a fourth RX beam, wherein the fourth RX beam has a beamwidth that is narrower than the first RX beam and the second RX beam. The fourth RX beam can be a directional beam (with a greater antenna gain). The fourth RX beam can be generated between the first RX beam and the second RX beam. The beam angle of the first RX beam can be $\Omega_1$. The beam angle of the second RX beam can be $\Omega_2$. The beam angles of the respective beams can be measured with respect to a vertical direction, if the antenna elements of the UE 201 are arranged in an array (separated by a predefined distance) along the horizontal direction.

The processor 203 can generate the fourth RX beam between the first RX beam and the second RX beam by tuning the phase angles of the phase shifters of the antenna elements that are involved in generating the first RX beam and the second RX beam. If the phase angle of the phase shifters is 'X' degrees, the first RX beam is generated at the beam angle $\Omega_1$. The phase angle of the phase shifters to generate the first RX beam can be represented by $\varphi_1$. If the phase angle of the phase shifters is (X+θ) degrees, the second RX beam is generated at the beam angle of $\Omega_2$. The phase angle of the phase shifters to generate the second RX beam can be represented by $\varphi_2$. The processor 203 can tune the phase angles of the phase shifters such that the phase angle is (X+θ'), wherein 0<θ'<θ. The tuning of the phase angle by θ' can result in the generation of the fourth RX beam between the first RX beam and the second RX beam at the beam angle of $\Omega_4$.

The phase angles of the phase shifters at which the first and second RX beams are generated can be represented as follows:

$$\phi_1 = \frac{2\pi d}{\lambda}\sin(\Omega_1),$$ Equation 1 and $$\phi_2 = \frac{2\pi d}{\lambda}\sin(\Omega_2)$$

In an embodiment, the relationship between the beam angles of the first RX beam and the second RX beam with the beam angle of the fourth RX beam, can be represented as:

$$\Omega_4 = \frac{\Omega_1 + \Omega_2}{2}$$ Equation 2

The phase angle (X+θ') of the phase shifters at which the fourth RX beam is generated can be represented as:

$$\phi_4 = \frac{2\pi d}{\lambda}\sin(\Omega_4)$$ Equation 3

In another embodiment, the relationship between the beam angles of the first RX beam and the second RX beam with the beam angle of the fourth RX beam; is represented as:

$$d\sin(\Omega_4) = \frac{d\sin(\Omega_1) + d\sin(\Omega_2)}{2}$$ Equation 4

The phase angle (X+θ') of the phase shifters at which the fourth RX beam is generated, can be represented as:

$$\phi_4 = \frac{2\pi d}{\lambda}\sin(\Omega_4) = \frac{2\pi d}{\lambda}\left(\frac{\sin(\Omega_1) + \sin(\Omega_2)}{2}\right)$$ Equation 5

The processor 203 can tune the angles of the phase shifters and the gains of the LNAs/PAs (to generate either the third RX beam or the fourth RX beam) based on a distance between the UE 201 and the gNB 202, instantaneous conditions of channels used for communication between the UE 201 and the gNB 202, and types of messages (such as Physical Random Access Channel (PRACH), Physical Downlink Control Channel (PDCCH), Physical Uplink Scheduling Channel (PUSCH), Physical Downlink Scheduling Channel (PDSCH), and so on) exchanged between the UE 201 and the gNB 202.

In an embodiment, if the distance between the UE 201 and the gNB 202 is less than a predefined distance, and the instantaneous channel conditions are optimal, the processor 203 can generate the third RX beam having a wide beamwidth compared to the beamwidths of the first RX beam and the second RX beam.

In an embodiment, if the distance between the UE 201 and the gNB 202 is greater than the predefined distance, and the instantaneous channel conditions are not optimal, the processor 203 can generate the fourth RX beam, i.e., the RX beam with narrow beamwidth, between the first RX beam and the second RX beam.

If the first RX beam and the second RX beam are not aligned in the direction of the TX beam, the processor 203 can generate the third RX beam or the fourth RX beam, such that one of the generated beams is aligned in the direction of the TX beam transmitted by the gNB 202.

In an embodiment, if the UE 201 is acting as a transmitter and the gNB 202 is acting as a receiver, the UE 201 can generate TX beams using the same set of RX beams. The processor 203 can consider the first RX beam as a first TX beam and the second RX beam a second TX beam, based on RSRP/SINR measurements performed with respect to the RX beams. The processor 203 can refine the beam codebooks of the TX beams to generate a third TX beam with a wider beamwidth or a fourth TX beam with a narrower beamwidth. If the first TX beam and the second TX beam are not aligned in the direction of the gNB 202 RX beam, the processor 203 can generate at least one TX beam, such that at least one generated beam is aligned in the direction of the gNB 202 RX beam.

The processor 203 can optimize the measurement of a gNB 202 TX beam using the UE 201 RX beams. The processor 203 can measure the gNB 202 TX beam by determining RSRP values associated with beams having a wider beamwidth (third RX beam) and narrower beamwidth (fourth RX beam). The processor 203 can compute the difference (represented by $\Delta_{RSRP}$) between the RSRP value associated with the third RX beam and the RSRP value associated with the fourth RX beam as follows:

$$\Delta_{RSRP} \cong RSRP|_{wider\ Rx\ beam, Tx\ beam} - RSRP|_{narrow\ Rx\ beam, Tx\ beam\ j}$$ Equation 6

The processor 203 can store the measurements in the memory 204. The processor 203 can choose to measure a particular TX beam at a later stage by determining the RSRP with respect to the RX beam with a wider beamwidth and scale the measurement using the ARSRP to determine the RSRP with respect to the RX beam with a narrower beamwidth. This can reduce the power consumption of the UE 201 during measurement, since the number of antenna elements that are required to be active for generating the beam with the wider beamwidth is less than the number of antenna elements that are required to generate the beam with the narrow beamwidth.

FIG. 2 shows units of the UE 201, but it is to be understood that other embodiments are not limited thereon. In other embodiments, the UE 201 may include less or more number of units. Further, the labels or names of the units are used only for illustrative purpose and does not limit the scope of the disclosure. One or more units can be combined together to perform same or substantially similar function in the UE 201.

Figure 3:
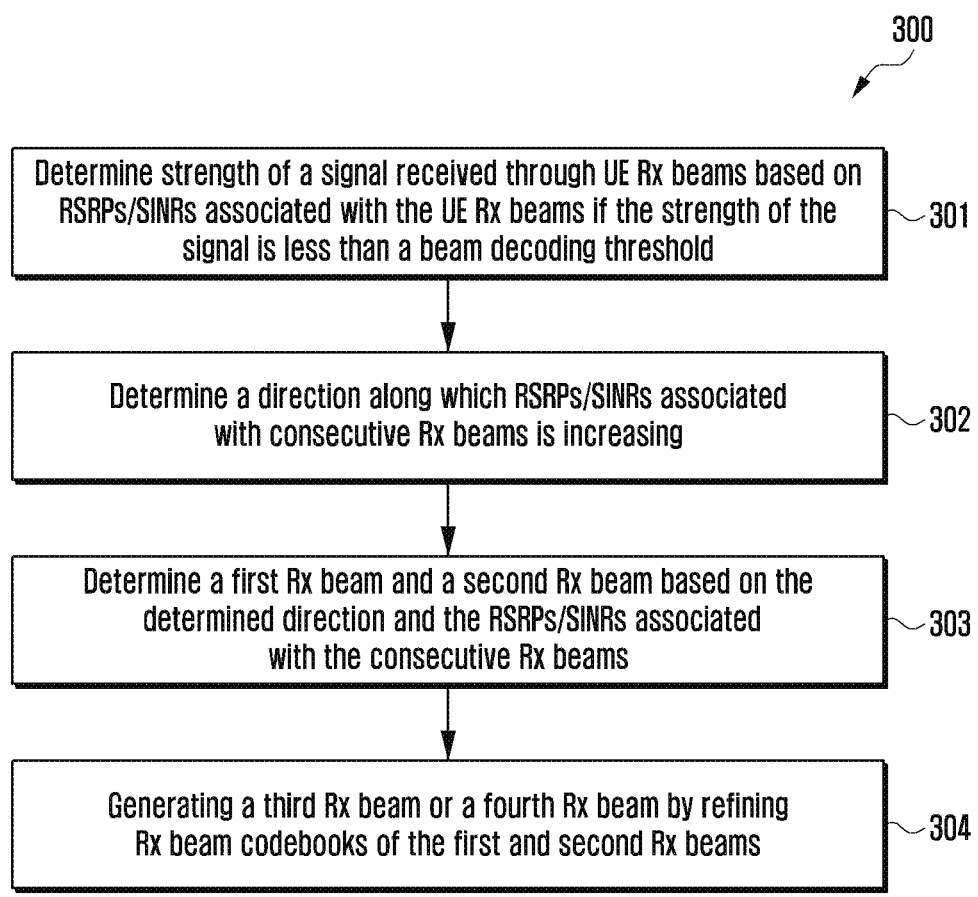
FIG. 3 is a flowchart depicting a method for adapting beamwidth of beams of a UE, according to an embodiment of the disclosure.

FIG. 3 is a flowchart depicting a method for adapting beamwidth of the beams of a UE, according to an embodiment of the disclosure.

Referring to FIG. 3, in a method 300, at operation 301, the method includes determining the strength of a signal received through UE 201 RX beams if the strength of the signal received through the RX beams is less than a predefined beam decoding threshold. The signal is transmitted using a gNB 202 TX beam, wherein the UE 201 (which is acting as a receiver) is attempting to receive the TX beam from the gNB 202 (which is acting as a transmitter). The embodiments include determining whether there is alignment between the RX beams and the TX beams, during RX beam sweep. As the strength of the signal received through the RX beams is less than the predefined beam decoding threshold, the embodiments include determining that there is no alignment between the RX beams and the TX beams. The UE 201 can create the alignment by refining beam codebooks of the RX beams. The embodiments include determining the strengths of the signal received through different RX beams based on RSRPs/SINRs associated with the different RX beams.

At operation 302, the method includes determining a direction along which the RSRPs/SINRs associated with consecutive RX beams is increasing. In an example, consider that the signal is received through four RX beams 'i', 'i+1', 'i+2', and 'i+3'. The beam 'i' is consecutive to beam 'i+1', beam 'i+1' is consecutive to beam 'i+2', beam 'i+2' is consecutive to beam 'i+3', and beam 'i+3' is consecutive to beam 'i'. The embodiments include determining that $RSRP_{i+3} < RSRP_{i+2} < RSRP_{i+i}$, and $RSRP_i < RSRP_{i+1}$. Therefore, the direction along which the RSRPs/SINRs associated with consecutive RX beams is increasing is (i+3)–(i+2)–(i+1).

At operation 303, the method includes determining a first RX beam and a second RX beam based on the determined direction and RSRPs/SINRs associated with the consecutive RX beams. The embodiments include considering the beam 'i+1' as the first RX beam and beam 'i' as the second RX beam. This is because, the RSRP associated with the beam 'i+1' is greater than the RSRP associated with beam 'i', and the RSRP associated with the beam 'i+1' is the greatest along the direction in which the RSRPs associated with the consecutive RX beams 'i+1', 'i+2', and 'i+3' is increasing.

At operation 304, the method includes generating at least one RX beam (such as a third RX beam, a fourth RX beam, and so on) by refining the RX beam codebooks of the first and second RX beams, wherein at least one of the generated RX beam is aligned in the direction of the TX beam transmitted by the gNB 202. Refining the RX beam codebooks include tuning the angles of phase shifters and the gains of the PAs/LNAs of antenna elements of the UE 201. In an embodiment, the tuning of the RX beam codebooks leads to the generation of the third RX beam, having a beamwidth that is wider than the first RX beam and the second RX beam. The generation of the third RX beam leads to the replacement of the first RX beam and the second RX beam. The embodiments include reducing the number of active antenna elements to generate the third RX beam, which in turn can lead to the reduction of the power consumption of the UE 201.

In another embodiment, the tuning of the RX beam codebooks leads to the generation of the fourth RX beam, having a beamwidth that is narrower than the first RX beam and the second RX beam. The fourth RX beam can be generated between the first RX beam and the second RX beam. The embodiments include determining the beam angles of the first RX beam and the second RX beam. The embodiments include determining the beam angle of the fourth RX beam based on the beam angles of the first RX beam and the second RX beam. The embodiments include determining the phase angle by which the phase shifters need to be tuned to generate the fourth RX beam.

The embodiments include generating the RX beam based on a distance between the UE 201 and the gNB 202, instantaneous channels conditions used for communication between the UE 201 and the gNB 202, and types of messages exchanged between the UE 201 and the gNB 202.

The various actions in the method 300 may be performed in the order presented, in a different order, or simultaneously. Further, in some embodiments, some actions listed in FIG. 3 may be omitted.

Figure 4:
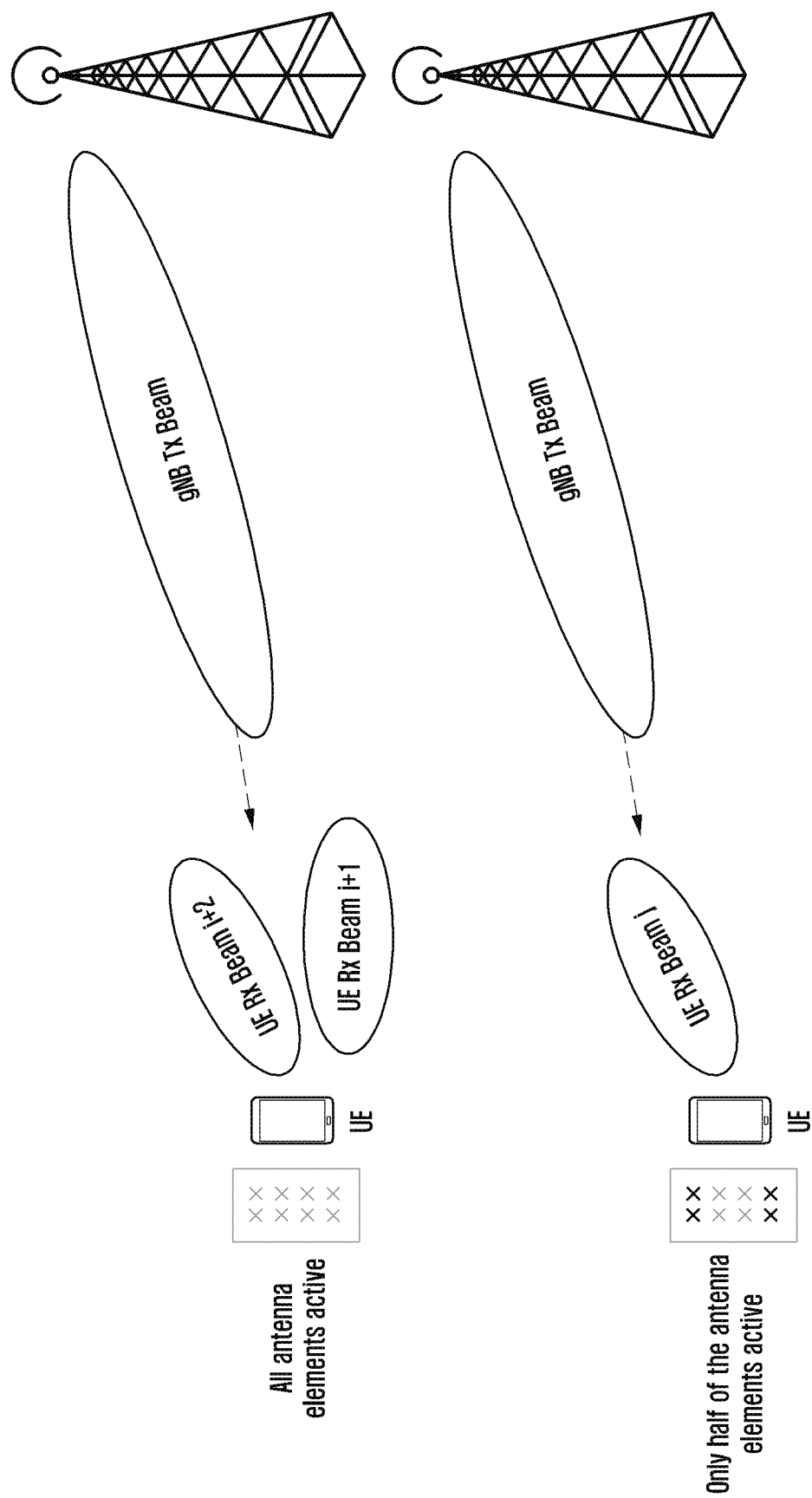
FIG. 4 is an example scenario depicting replacement of existing RX beams with generation of a new RX beam, wherein a beamwidth of the generated RX beam is wider compared to beamwidths of the existing RX beams, according to an embodiment of the disclosure.

FIG. 4 is an example scenario depicting a replacement of existing RX beams with generation of a new RX beam, wherein a beamwidth of the generated RX beam is wider compared to beamwidths of the existing RX beams, according to an embodiment of the disclosure. In the current example scenario, consider that the UE 201 is acting as receiver and the gNB 202 is acting as transmitter.

Referring to FIG. 4, the RX beams at the UE 201 are not aligned in the direction of the TX beam of the gNB 202. The RX beam 'i+1' can be considered as the first RX beam. The RX beam 'i+2' can be considered as the second RX beam, wherein the RSRP/SINR associated with the RX beam 'i+2' is less than the RSRP/SINR associated with the RX beam 'i+1'. The number of active antenna elements (that are required for sustaining the RX beams 'i+1' and 'i+2') is 8.

The embodiments include refining the RX beam codebooks of the existing RX beams 'i+1' and 'i+2', to generate a new RX beam 'j'. The generation of the new RX beam 'j' leads to the replacement of the existing RX beams 'i+1' and 'i+2'. The beamwidth of the RX beam 'j' is wider than the beamwidths of the existing RX beams 'i+1' and 'i+2'. The number of active antenna elements required to generate the RX beam 'j' is 4.

Thus, the number of active UE 201 antenna elements is reduced by half. The power consumption of the UE 201 is reduced by reduction of the number of active UE 201 antenna elements. The reduction of the number of active UE 201 antenna elements leads to the generation of the RX beam 'j' with a wider beamwidth, which is aligned in the direction of the gNB 202 TX beam.

Figure 5:
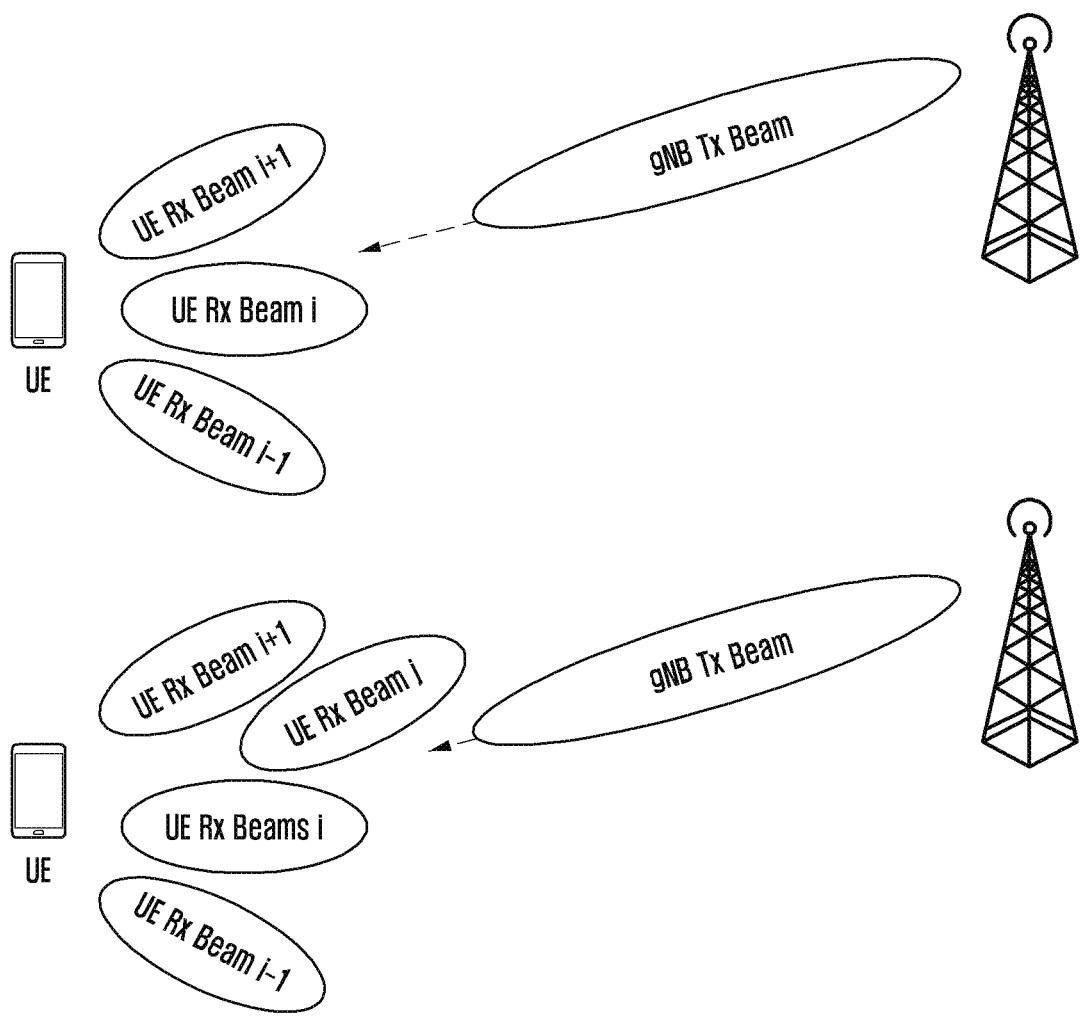
FIG. 5 is an example scenario depicting generation of a new RX beam between two existing RX existing beams, wherein a beamwidth of a new RX beam is narrower compared to beamwidths of the existing RX beams, according to an embodiment of the disclosure.

FIG. 5 is an example scenario depicting a generation of a new RX beam between two existing RX beams, wherein a beamwidth of the new RX beam is narrower compared to the of the RX existing beams, according to an embodiment of the disclosure. In the example scenario, consider that the UE 201 is acting as receiver and the gNB 202 is acting as transmitter.

Referring to FIG. 5, the RX beams at the UE 201 are not aligned in the direction of the TX beam of the gNB 202. The RX beam 'i' can be considered as the first RX beam. The RX beam 'i+1' can be considered as the second RX beam. The RSRP/SINR associated with the RX beam 'i' greater than the RSRP/SINR associated with the RX beam 'i−1'.

The beam angle of the RX beam 'i' can be $\Omega_I$. The beam angle of the RX beam 'i+1' can be $\Omega_{I+1}$. The phase angle of the phase shifters (involved in generating the RX beam 'i') corresponding to the beam angle $\Omega_I$ can be 'X' degrees. The phase angle of the phase shifters (involved in generating the RX beam 'i+1') corresponding to the beam angle $\Omega_{I+1}$ can be (X+θ) degrees. The embodiments include refining the RX beam codebooks, by tuning the phase angle of the phase shifters for generating a new RX beam 'j' between the existing RX beams 'i' and 'i+1'. The beam angle of the RX beam 'j' can be $\Omega_J$.

The beamwidth of the RX beam 'j' is narrower than the beamwidth of the RX beams 'i' and 'i+1'. The phase angle of the phase shifters corresponding to the beam angle $\Omega_J$ can be (X+θ') degrees. The embodiments include tuning the phase angle of the at least one phase shifter by θ', wherein 0<θ'<θ. The tuning of the phase angle by θ' can result in the generation of the RX beam 'j' having a narrow beamwidth, which is aligned in the direction of the TX beam of the gNB 202.

Figure 6A:
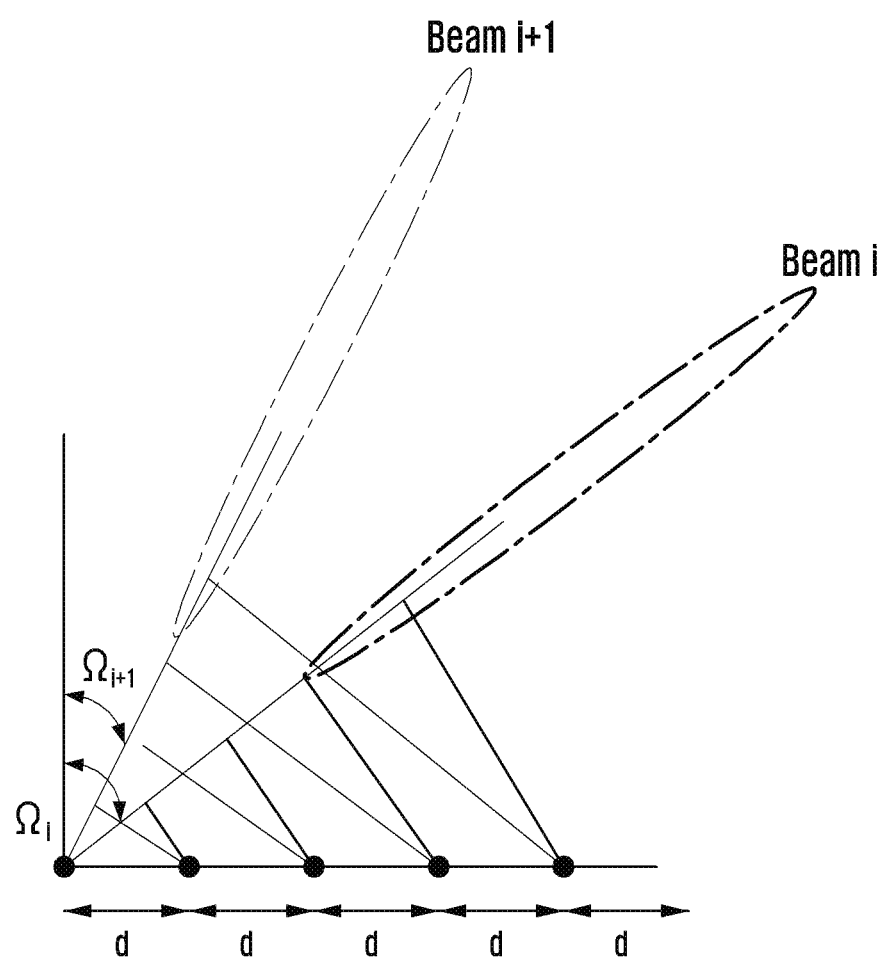
FIGS. 6A and 6B depict the computation of a phase angle corresponding to a beam angle of an RX beam having a narrow beamwidth, according to various embodiments of the disclosure.
Figure 6B:
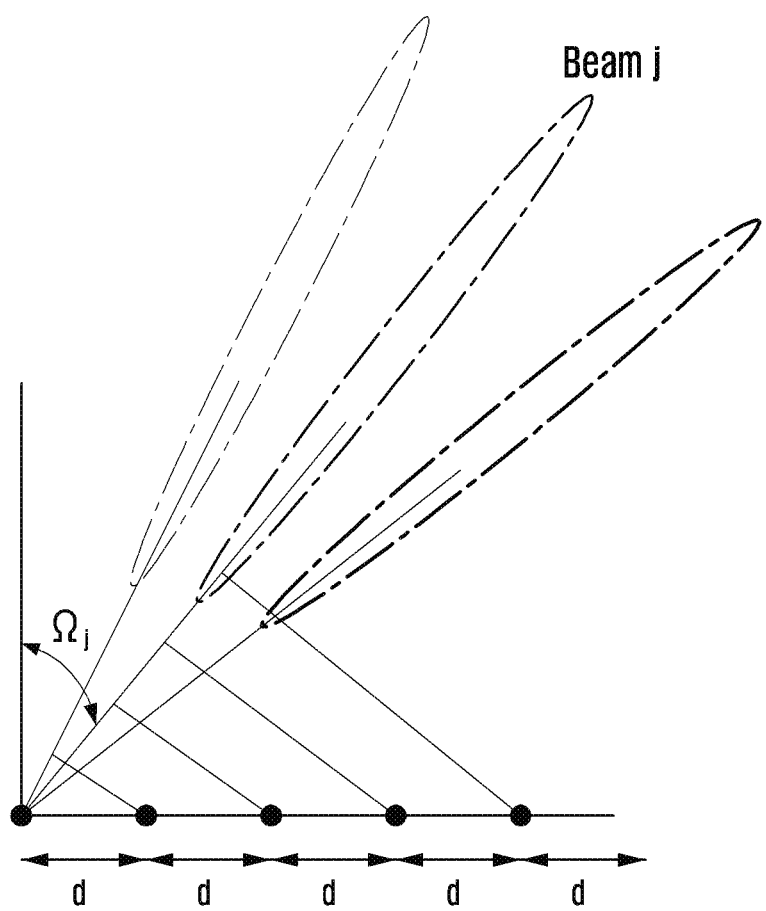

FIGS. 6A and 6B depict the computation of a phase angle corresponding to a beam angle of an RX beam having a narrow beamwidth, according to various embodiments of the disclosure.

The embodiments include computing the phase angle in order to tune the phase shifters of the antenna elements of the UE 201, wherein the antenna elements are placed in an array. The antenna elements can be separated by a predefined distance 'd'. The phase angle can be determined based on the beam angle of the narrow RX beam, which has been generated between two RX beams having wider beamwidth. The beam angle of the narrow RX beam is based on the beam angles of the beams between which the narrow RX beam is generated.

Consider that the narrow RX beam is generated between RX beams 'i' and 'i+1'. Referring to FIG. 6A, the beam angles of the RX beams 'i' and 'i+1' can be represented as $\Omega_i$ and $\Omega_{i+1}$. The phase angles corresponding to the RX beams 'i' and 'i+1' can be determined as follows:

$$\phi_i = \frac{2\pi d}{\lambda}\sin(\Omega_i),$$

$$\phi_{i+1} = \frac{2\pi d}{\lambda}\sin(\Omega_{i+1})$$

Equation 7

Referring to FIG. 6B, the narrow RX beam is referred to as beam 'j', which is generated between the RX beam 'i' and the RX beam 'i+1'. The beam angle of the RX beam 'j' can be represented as $\Omega_j$. The phase angle corresponding to the RX beam 'j' can be determined as:

$$\phi_j = \frac{2\pi d}{\lambda}\sin(\Omega_j)$$

Equation 8

In an embodiment, the relation between the beam angle of the RX beam 'j' and the beam angles of the beams 'i' and 'i+1' can be $$\Omega_j = \frac{\Omega_i + \Omega_{i+1}}{2}.$$

Therefore, the phase angle by which the phase shifters of the antenna elements is to be tuned is computed as:

$$\phi_j = \frac{2\pi d}{\lambda}\left(\frac{\Omega_i + \Omega_{i+1}}{2}\right)$$

Equation 9

In an embodiment, the relation between the beam angle of the RX beam 'j' and the beam angles of the beams 'i' and 'i+1' can be $$d\sin(\Omega_j) = \frac{d\sin(\Omega_i) + d\sin(\Omega_{i+1})}{2}$$

Equation 10

Therefore, the phase angle by which the phase shifters of the antenna elements is to be tuned is computed as:

$$\phi_j = \frac{2\pi d}{\lambda}\sin(\Omega_j) = \frac{2\pi d}{\lambda}\left(\frac{\sin(\Omega_i) + \sin(\Omega_{i+1})}{2}\right)$$

Equation 11

Figure 6C:
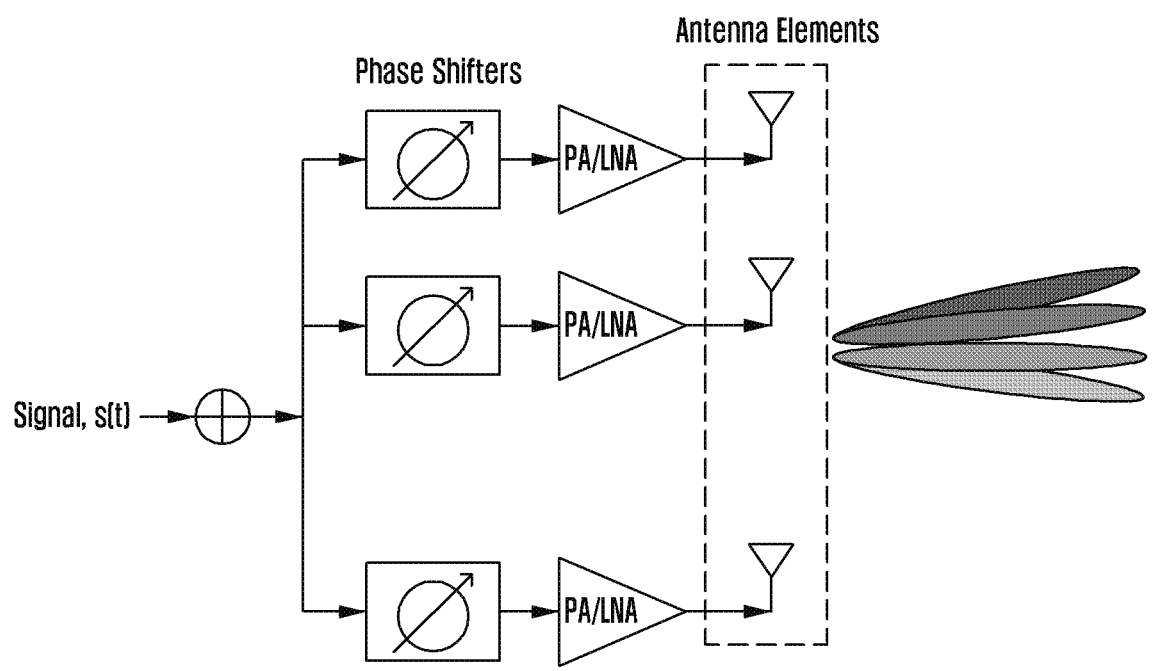
FIG. 6C depicts an array of antenna elements of a UE and Power Amplifiers and Low Noise Amplifiers (PAs/LNAs) associated with antenna elements used for managing a UE beam codebook, according to an embodiment of the disclosure.

FIG. 6C depicts an array of antenna elements of a UE, and PAs and LNAs associated with antenna elements, used for managing a UE beam codebook, according to an embodiment of the disclosure.

Referring to FIG. 6C, the embodiments can manage the number of antenna elements that are allowed to be active at a particular time instant. The beams can become wide and the number of generated beams can reduce, compared to the width and the number of current beams, if the number of active antenna elements is reduced.

If the phase angles of the phase shifters are adjusted, a narrow beam can be generated between two existing beams. The phase angle of the generated beam is greater than the phase angle used for generating one of the existing beams and less than the phase angle used for generating the other existing beam.

Figure 7:
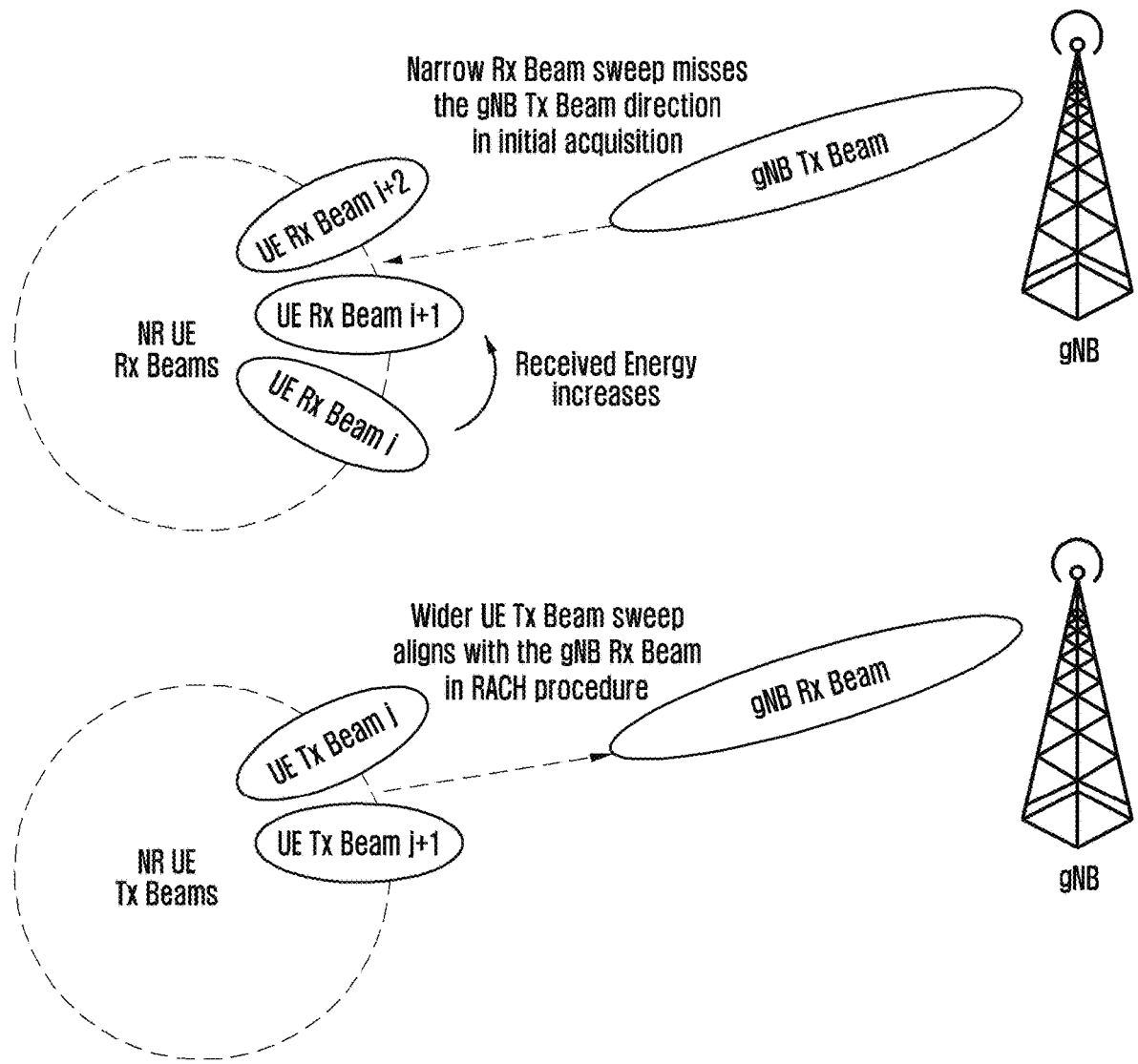
FIG. 7 is an example scenario depicting a refinement of UE TX beam codebooks for generating TX beams having wider beamwidths, according to an embodiment of the disclosure.

FIG. 7 is an example scenario depicting a refinement of UE TX beam codebooks for generating TX beams having wider beamwidths, according to an embodiment of the disclosure.

Referring to FIG. 7, consider that the UE 201 is initially acting as a receiver and the gNB 202 is acting as a transmitter. The UE 201 can determine that the RX beams are not aligned in the direction of the gNB 202 TX beam, as the RX beams with narrow beamwidth miss the direction of the gNB 202 TX beam during initial acquisition. The UE 201 can measure the RSRPs/SINRs associated with each of the RX beams 'i', 'i+1', and 'i+2'. In an embodiment, the UE 201 can perform the measurements during the initial acquisition. The UE 201 can determine that the RX beam 'i+1' is the first RX beam, and the RX beam 'i+2' is the second RX beam based on the measurements.

The embodiments include generating the TX beams using the RX beams, when the UE 201 acts as the transmitter and the gNB 202 acts as the receiver. As it is determined that the RX beams of the UE 201 are not aligned with the gNB 202 TX beams, the UE 201 can refine the TX beam codebooks to align the UE 201 TX beams and the gNB 202 RX beam. The TX beam cookbooks can be refined by tuning the phase shifters and the PAs/GNAs of the antenna elements of the UE 201. In an embodiment, the refinement can lead to generation of TX beams 'j' and 'j+1'. The refinement of the UE 201 TX codebook can be performed during the RACH procedure.

The embodiments include determining that the UE 201 is located near the gNB 202, based on the distance between the UE 201 and the gNB 202 (distance between the UE 201 and gNB 202 is less than the predefined distance). The embodiments further include determining that the instantaneous channel condition is optimal. Based on these determinations, the UE 201 can perform the refinement, such that the TX beams 'j' and 'j+1' are generated. The beamwidths of the TX beams 'j' and 'j+1' are wider compared to the RX beams 'i', 'i+1', and 'i+2'. The refining of the TX beam codebook leads to the alignment between the TX beams of the UE 201 and the RX beam of the gNB 202. Once the alignment has been achieved, the UE 201 can transmit messages such as PRACH and PUSCH.

Figure 8:
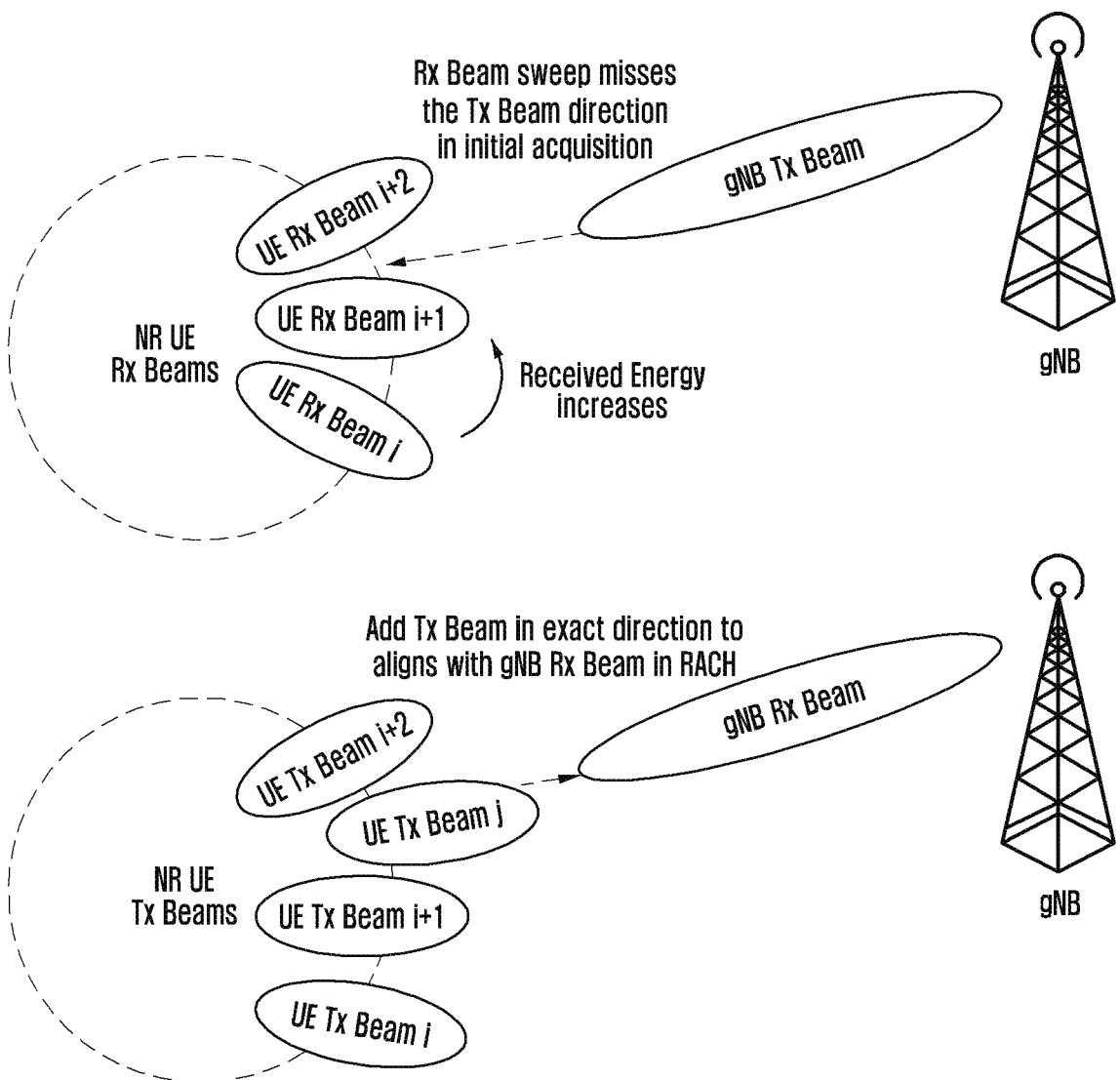
FIG. 8 is an example scenario depicting a refinement of UE TX beam codebooks for generating TX beams having narrow beamwidths, according to an embodiment of the disclosure.

FIG. 8 is an example scenario depicting a refinement of UE TX beam codebooks for generating TX beams having narrow beamwidths, according to an embodiment of the disclosure.

Referring to FIG. 8, consider that the UE 201 is initially acting as a receiver and the gNB 202 is acting as a transmitter. The UE 201 can determine that the RX beams are not aligned with the gNB 202 TX beam, as the RX beam sweep misses the direction of the gNB 202 TX beam during initial acquisition. The UE 201 measures the RSRPs/SINRs associated with each of the RX beams 'i', 'i+1', and 'i+2'. The RX beam 'i+1' is the first RX beam and the RX beam 'i+2' is the second RX beam. As the UE 201 RX beams are not aligned with the gNB 202 TX beams, the UE 201 can refine the TX beam codebooks to align the UE 201 TX beams and the gNB 202 RX beams, when the UE 201 is acting as the transmitter and the gNB 202 is acting as the receiver.

The embodiments include determining that the UE 201 is located far from the gNB 202, based on the distance between the UE 201 and the gNB 202 (distance between the UE 201 and gNB 202 is greater than the predefined distance). The embodiments further include determining that the instantaneous channel condition is not optimal. Based on these determinations, the UE 201 can perform the refinement of TX beam codebooks such that the TX beam 'j' is generated between the TX beams 'i+1' and 'i+2 (initially acting as RX beams). The refinement is performed by tuning the phase angles of the phase shifters of the antenna elements of the UE 201 used for generating the TX beams.

The beamwidth of the TX beam 'j' is narrow compared to the RX beams 'i+1', and 'i+2'. The refining of the TX beam codebook leads to the alignment between the TX beams of the UE 201 and the RX beam of the gNB 202. Once the alignment has been achieved, the UE 201 can transmit messages such as NPRACH and NPUSCH.

Figure 9:
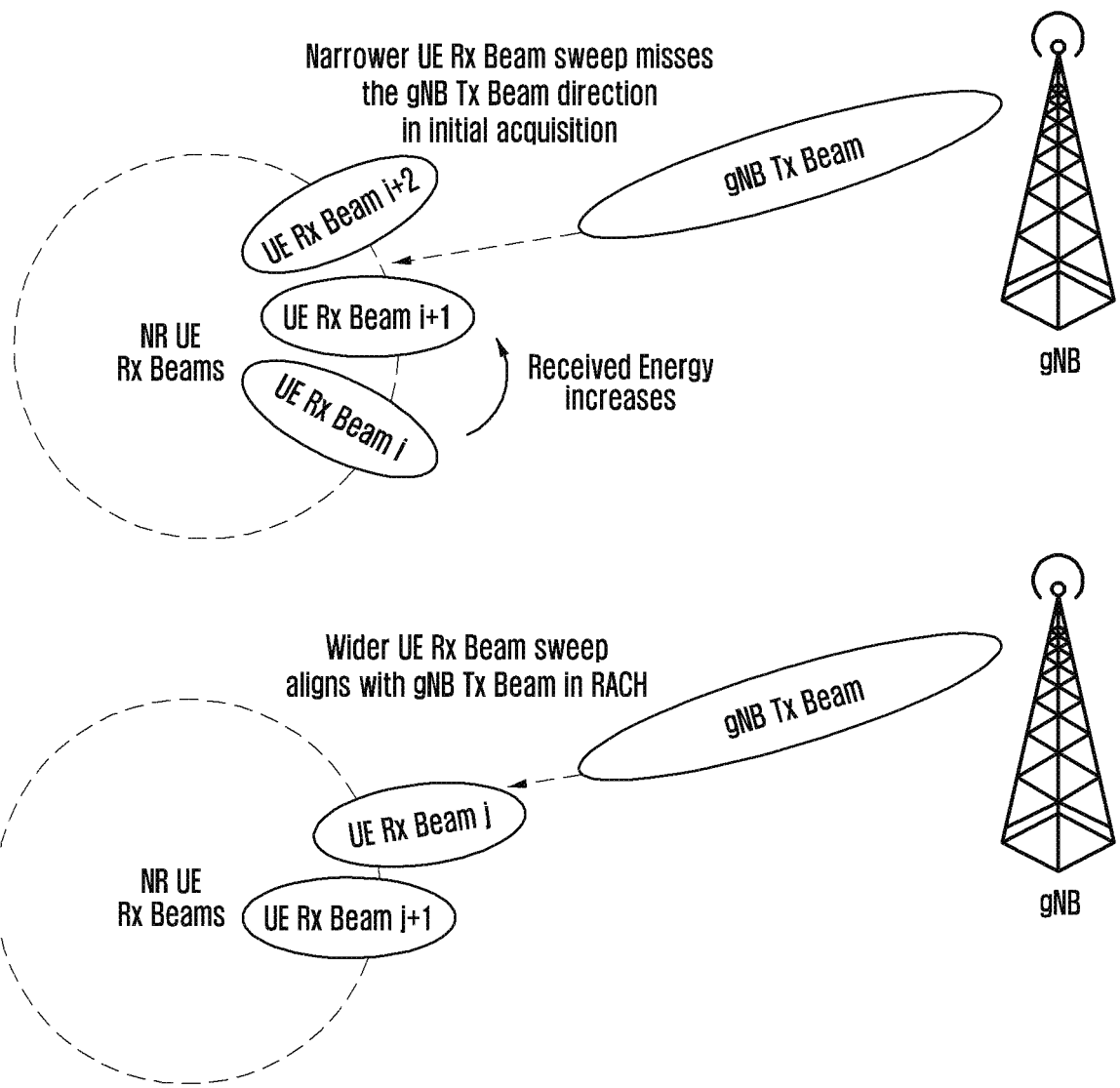
FIG. 9 depicts an example replacement of existing RX beams and generation of new RX beams, wherein a beamwidth of the generated RX beams is wider compared to beamwidths of the replaced RX beams, according to an embodiment of the disclosure.

FIG. 9 depicts an example replacement of existing RX beams and generation of new RX beams, wherein a beamwidth of the generated RX beams is wider compared to beamwidths of the replaced RX beams, according to an embodiment of the disclosure. Consider that the UE 201 is acting as the receiver and the gNB 202 is acting as the transmitter.

Referring to FIG. 9, the UE 201 can determine that the existing RX beams are not aligned in the direction of the TX beam of the gNB 202, as the existing RX beams with narrow beamwidth miss the direction of the TX beam of the gNB 202 during initial acquisition. The RX beam 'i+1' is determined to be the first RX beam, wherein the RSRP/SINR associated with the RX beam 'i+1' is best in the direction along which the RSRPs/SINRs of consecutive RX beams ('i', 'i+1', and 'i+2') is increasing. The RX beam 'i+2' can be determined to be the second RX beam, wherein the RSRP/SINR associated with the RX beam 'i+2' is less than the RSRP/SINR associated with the RX beam 'i+1'. The UE 201 can perform the RSRP/SINR measurements during the initial acquisition.

The embodiments include refining the RX beam codebook by tuning the phase shifters and the gains of the PAs/LNAs of the antenna elements of the UE 201. The refinement of the UE 201 RX codebook can be performed during the RACH procedure. The refining can lead to the generation of new RX beams 'j' and 'j+1' and replacement of the RX beams 'i', 'i+1' and 'i+2'. The beamwidth of the RX beams 'j' and 'j+1' is wider than the beamwidth of the RX beams 'i', 'i+1' and 'i+2'. The refining of the RX beam codebooks leads to the alignment between the RX beams of the UE 201 and the TX beam of the gNB 202. Once the alignment has been achieved, the UE 201 can receive messages such as PRACH and PUSCH.

Figure 10:
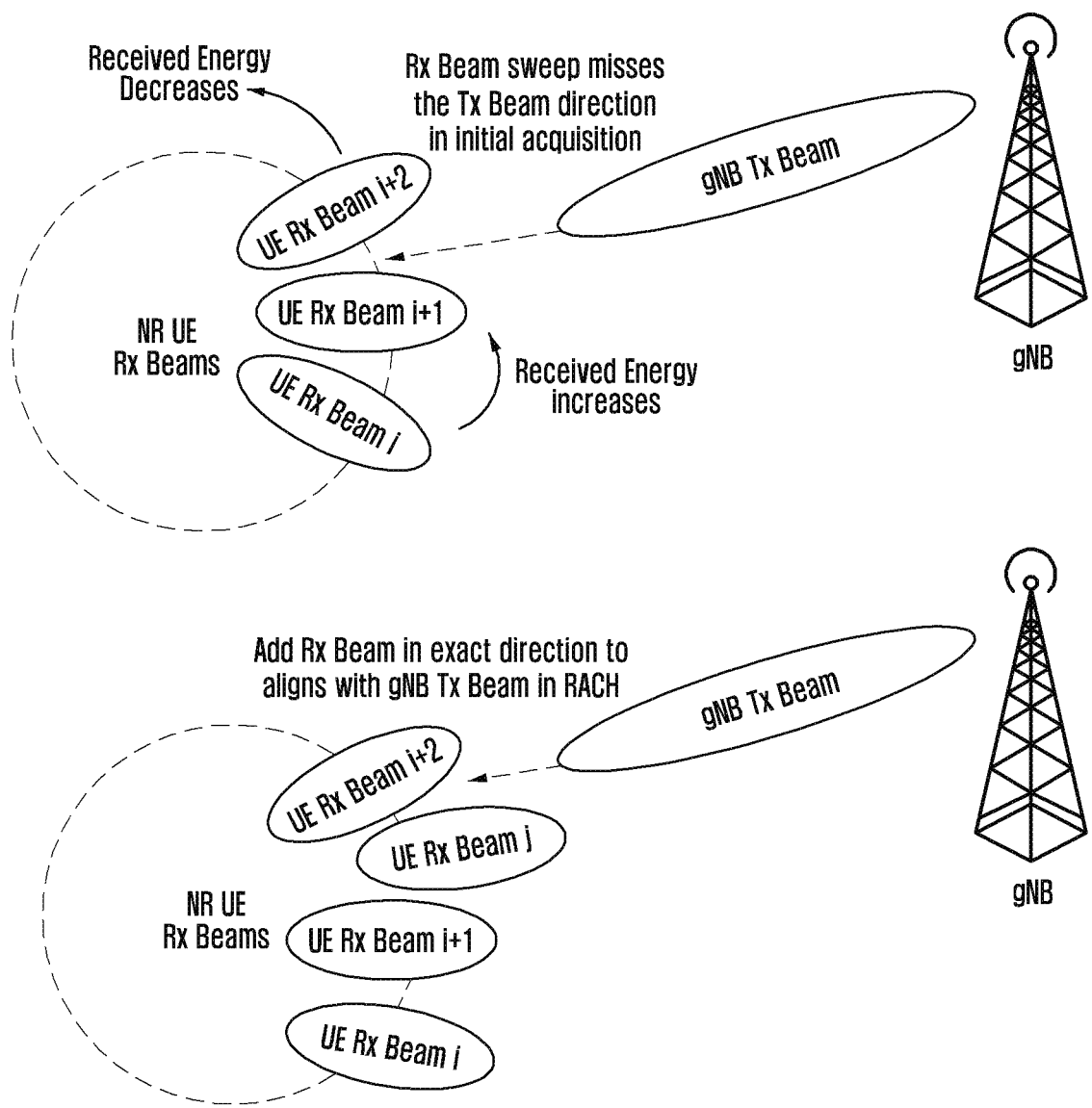
FIG. 10 depicts an example generation of a new RX beam between two existing RX existing beams, wherein a beamwidth of the new RX beam is narrower compared to beamwidths of the existing RX beams, according to an embodiment of the disclosure.

FIG. 10 depicts an example generation of a new RX beam between two existing RX existing beams, wherein a beamwidth of the new RX beam is narrower compared to beamwidths of the existing RX beams, according to an embodiment of the disclosure. Consider that the UE 201 is acting as the receiver and the gNB 202 is acting as the transmitter.

Referring to FIG. 10, the UE 201 can determine that the existing RX beams are not aligned in the direction of the TX beam of the gNB 202, as the RX beam sweep misses the direction of the TX beam during initial acquisition. The RX beam 'i+1' is determined to be the first RX beam. The RX beam 'i+2' is determined to be the second RX beam. The RSRP/SINR associated with the RX beam 'i+1' is determined to be greater than the RSRP/SINR associated with the RX beam 'i+2' during the initial acquisition.

The embodiments include determining that the UE 201 is located far from the gNB 202, based on the distance between the UE 201 and the gNB 202 (distance between the UE 201 and gNB 202 is greater than the predefined distance). The embodiments further include determining that the instantaneous channel condition is not optimal. Based on these determinations, the UE 201 can perform the refinement of RX beam codebooks such that the RX beam 'j' is generated between the RX beams 'i+1' and 'i+2. The refinement is performed by tuning the phase angles of the phase shifters of the antenna elements of the UE 201.

The beamwidth of the RX beam 'j' is narrow compared to the RX beams 'i+1', and 'i+2'. The refining of the RX beam codebook leads to the alignment between the RX beams of the UE 201 and the TX beam of the gNB 202. Once the alignment has been achieved, the UE 201 can transmit messages such as PRACH and PUSCH.

Figure 11:
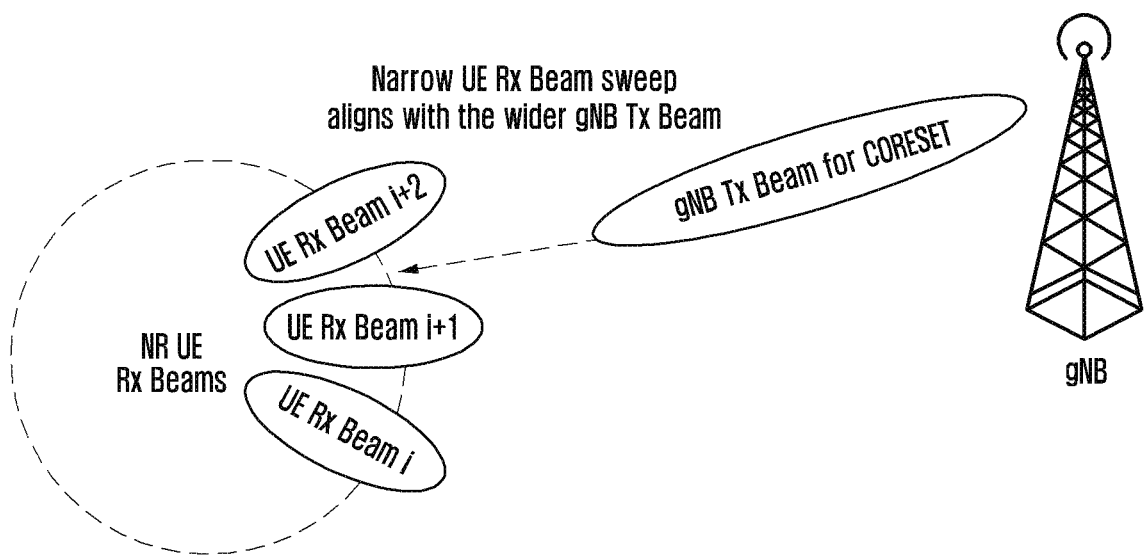
FIG. 11 is an example scenario depicting reception of a Physical Downlink Control Channel (PDCCH) using wide RX beams, wherein the RX beams are generated by refining RX beam codebooks, according to an embodiment of the disclosure.

FIG. 11 is an example scenario depicting a reception of a PDCCH using wide RX beams, wherein the RX beams are generated by refining RX beam codebooks, according to an embodiment of the disclosure.

Referring to FIG. 11, the UE 201 can receive the PDCCH using a RX beam 'i+1'. The PDCCH message meant for the UE 201 can be transmitted by the gNB 202 along with other PDCCH messages on a Control Resource Set (CORESET).

As the PDCCH message meant for the UE 201 is shared with other UEs by transmitting the PDCCH message on a CORESET, it can be inferred that the gNB 202 transmits the PDCCH message on a beam with a wider beamwidth compared to beams used for unicast transmissions on NPDSCH scheduled for the UE 201. Therefore, the UE 201 can refine the RX beam codebook for generating the RX beams 'i', 'i+1', and 'i+2' with narrow beamwidths. The RX beam codebook can be refined by tuning the phase angles of the phase shifters of the antenna elements of the UE 201. The RX beams 'i+1', and 'i+2' can increase the success rates of PDCCH reception.

Figure 12:
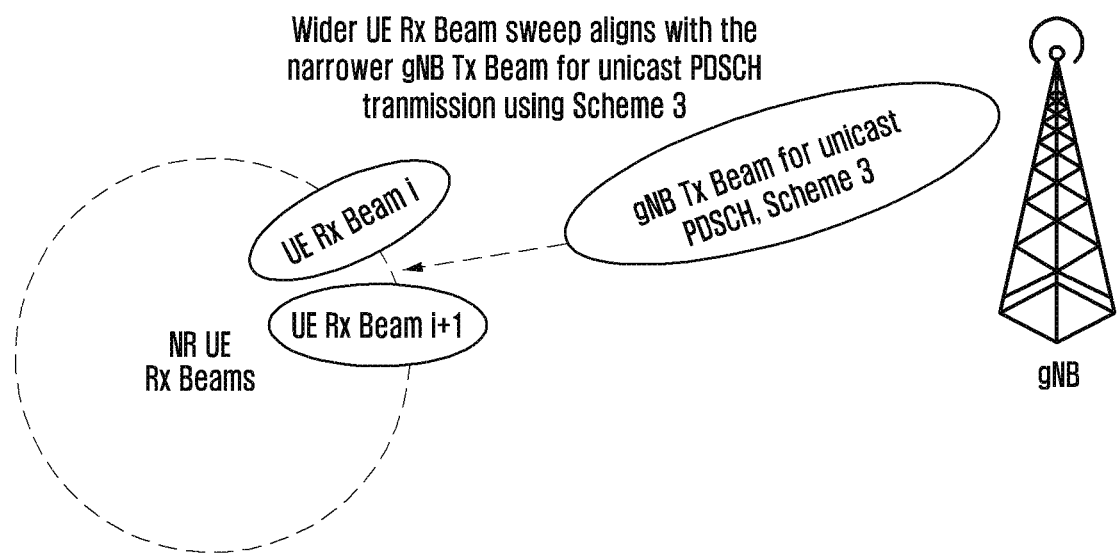
FIG. 12 is an example scenario depicting reception of a Physical Downlink Scheduled Channel (PDSCH) using narrow RX beams, wherein the RX beams are generated by refining a RX beam codebook, according to an embodiment of the disclosure.

FIG. 12 is an example scenario depicting a reception of a PDSCH using narrow RX beams, wherein the RX beams are generated by refining RX beam codebook, according to an embodiment of the disclosure.

Referring to FIG. 12, the UE 201 can receive the PDSCH using a RX beam 'i'. The PDSCH message meant for the UE 201 can be transmitted by the gNB 202 using a TX beam having a narrow beamwidth, compared to the beamwidth of the TX beam used for transmitting PDCCH on the CORESET.

In scheme 3 of PDSCH beam indication, provided to the UE 201 in a Downlink Control Information (DCI) in the PDCCH, if the scheduling offset between the reception of the DCI and the corresponding PDSCH is greater than or equal to a threshold offset, the gNB 202 can transmit the PDSCH using a different TX beam. The beamwidth of the beam used for transmitting the PDSCH can be narrower, compared to the beamwidth of the TX beam used for transmitting PDCCH, and with focused energy towards the UE 201.

Therefore, the UE 201 can refine the RX beam codebook for generating the RX beams 'i', and 'i+1' with wider beamwidths. The RX beam codebook can be refined by tuning the phase shifters and the PAs/LNAs of the antenna elements of the UE 201. The UE 201 can attempt to receive the unicast PDSCH with a beam having a wider beamwidth to prevent non-alignment with the narrower gNB 202 TX beam. The reception of the PDSCH using the RX beam 'i', can increase the success rates of PDSCH reception. Further, this can also save power, given the beams with wider beamwidths requires a lesser number of antenna elements to be active.

The embodiments disclosed herein can be implemented through at least one software program running on at least one hardware device and performing network management functions to control the network elements. The network elements shown in FIG. 2 include blocks which can be at least one of a hardware device, or a combination of hardware device and software module.

The embodiments disclosed herein describe methods and systems for generating beams, with wide or narrow beamwidth, in a wireless NR communication network using an appropriate beam codebook, so as to enable successful signal reception/transmission in scenarios such non-alignment between the beams of the UE and the gNB. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an application-specific integrated circuit (ASIC), or a combination of hardware and software means, e.g. an ASIC and a field programmable gate array (FPGA), or at least one microprocessor and at least one memory with software modules located therein. The method embodiments described herein could be implemented partly in hardware and partly in software. Alternatively, the disclosure may be implemented on different hardware devices, e.g. using a plurality of central processing units (CPUs).

While the disclosure has been shown and described with reference to various embodiment thereof, it will be understood by those skilled in the art that various changes in form and details may be made therein without departing from the spirit and scope of the disclosure as defined by the appended claims and their equivalents.

The invention claimed is:

1. A method performed by a User Equipment (UE) for aligning beams with beams of a Next Generation Node B (gNB), the method comprising:
    determining, by the UE, that strength of a signal, received through a plurality of Reception (RX) beams of the UE, is less than a threshold strength for decoding the signal, the signal being transmitted using a Transmission (TX) beam of the gNB;
    determining, by the UE, a direction along which the strength of the signal is increasing;
    determining, by the UE, a first RX beam and a second RX beam in the determined direction among the plurality of RX beams of the UE, a strength of the signal received through the first RX beam being greater than a strength of the signal received through the second RX beam; and
    generating, by the UE, a wide RX beam by refining RX beam codebooks of the first RX beam and the second RX beam, or a narrow RX beam to have a beam direction between beam directions of the first RX beam and the second RX beam,
    wherein the narrow RX beam is narrower than either the first RX beam or the second RX beam, and the wide RX beam is wider than either the first RX beam or the second RX beam, and
    wherein the RX beam codebooks are refined by tuning at least one of phase angles of phase shifters or gains of Power Amplifiers and Low Noise Amplifiers (PAs/LNAs) of at least one UE antenna element generating the first RX beam and the second RX beam.

2. The method, as claimed in claim 1,
    wherein the strength of the signal received through the first RX beam is greatest along the determined direction, and
    wherein the strength of the signal received through the plurality of RX beams of the UE is determined based on at least one of Reference Signal Received Power (RSRP) or Signal to Interference and Noise Ratio (SINR).

3. The method, as claimed in claim 2,
    wherein the wide RX beam is generated by reducing a number of active UE antenna elements of the at least one UE antenna element,
    wherein the narrow RX beam is generated by tuning the phase angles of the phase shifters of the at least one UE antenna element, and
    wherein the phase angles of the phase shifters of the at least one UE antenna element are tuned based on the beam direction of the first RX beam, the beam direction of the second RX beam, a distance between separated two antenna elements of the at least one UE antenna elements, and wavelength of signals received by at least one of the narrow RX beam, the first RX beam, or the second RX beam.

4. The method, as claimed in claim 1, wherein the generating of the one of the wide RX beam or the narrow RX beam is based on at least one of a condition of channels used for communication between the UE and the gNB, a distance between the UE and the gNB, or type of messages exchanged between the UE and the gNB.

5. The method, as claimed in claim 1, further comprising:
    measuring, by the UE, a strength of a signal received through the wide RX beam and a strength of a signal received through the narrow RX beam;
    computing, by the UE, a difference between the strength of a signal received through the wide RX beam and the strength of a signal received through the narrow RX beam; and
    determining, by the UE, a strength of the signal received through the narrow RX beam based on the strength of a signal received through the wide RX beam and the computed difference.

6. A User Equipment (UE) for aligning beams with beams of a Next Generation Node B (gNB), the UE comprising:
    memory storing one or more computer programs;
    a transceiver; and
    one or more processors communicatively coupled with the memory and the transceiver,
    wherein the one or more computer programs include computer-executable instructions that, when executed by the one or more processors, cause the UE to:
        determine that a strength of a signal, received through a plurality of Reception (RX) beams of the UE of the UE, is less than a threshold strength for decoding the signal, the signal being transmitted using a Transmission (TX) beam of the gNB, determine a direction along which the strength of the signal is increasing, determine a first RX beam and a second RX beam in the determined direction among the plurality of RX beams, a strength of the signal received through the first RX beam being greater than a strength of the signal received through the second RX beam, and generate a wide RX beam by refining RX beam codebooks of the first RX beam and the second RX beam, or a narrow RX beam to have a beam direction between beam directions of the first RX beam and the second RX beam, wherein the narrow RX beam is narrower than either the first RX beam or the second RX beam, and the wide RX beam is wider than either the first RX beam or the second RX beam, and wherein the RX beam codebooks are refined by tuning at least one of phase angles of phase shifters or gains of Power Amplifiers and Low Noise Amplifiers (PAs/LNAs) of at least one UE antenna element generating the first RX beam and the second RX beam.

7. The UE, as claimed in claim 6, wherein strength of the signal received through the first RX beam is greatest along the determined direction, and wherein the strength of the signal received through the plurality of RX beams of the UE is determined based on at least one of Reference Signal Received Power (RSRP) or Signal to Interference and Noise Ratio (SINR).

8. The UE, as claimed in claim 7, wherein the wide RX beam is generated by reducing a number of active UE antenna elements of the at least one UE antenna element, wherein the narrow RX beam is generated by tuning the phase angles of the phase shifters of the at least one UE antenna element, wherein the narrow RX beam is generated between the first RX beam and the second RX beam, and wherein the phase angles of the phase shifters of the at least one UE antenna element are tuned based on the beam direction of the first RX beam, the beam direction of the second RX beam, a distance between separated two antenna elements of the at least one UE antenna elements, and wavelength of signals received by at least one of the narrow RX beam, the first RX beam, or the second RX beam.

9. The UE, as claimed in claim 6, wherein the one or more computer programs further include computer-executable instructions that, when executed by the one or more processors, cause the UE to:

measure a strength of a signal received through the wide RX beam and a strength of a signal received through the narrow RX beam, compute a difference between the strength of a signal received through the wide RX beam and the strength of a signal received through the narrow RX beam, and determine a strength of the signal received through the narrow RX beam based on the strength of a signal received through the wide RX beam and the computed difference.

10. The UE, as claimed in claim 6, wherein the generating of the one of the wide RX beam or the narrow RX beam is based on at least one of a condition of channels used for communication between the UE and the gNB, a distance between the UE and the gNB, or type of messages exchanged between the UE and the gNB.

* * * * *